Oct. 19, 1926.
G. NAKIS
1,603,288
GLASS WASHER
Filed May 17, 1926
Fig. 1.
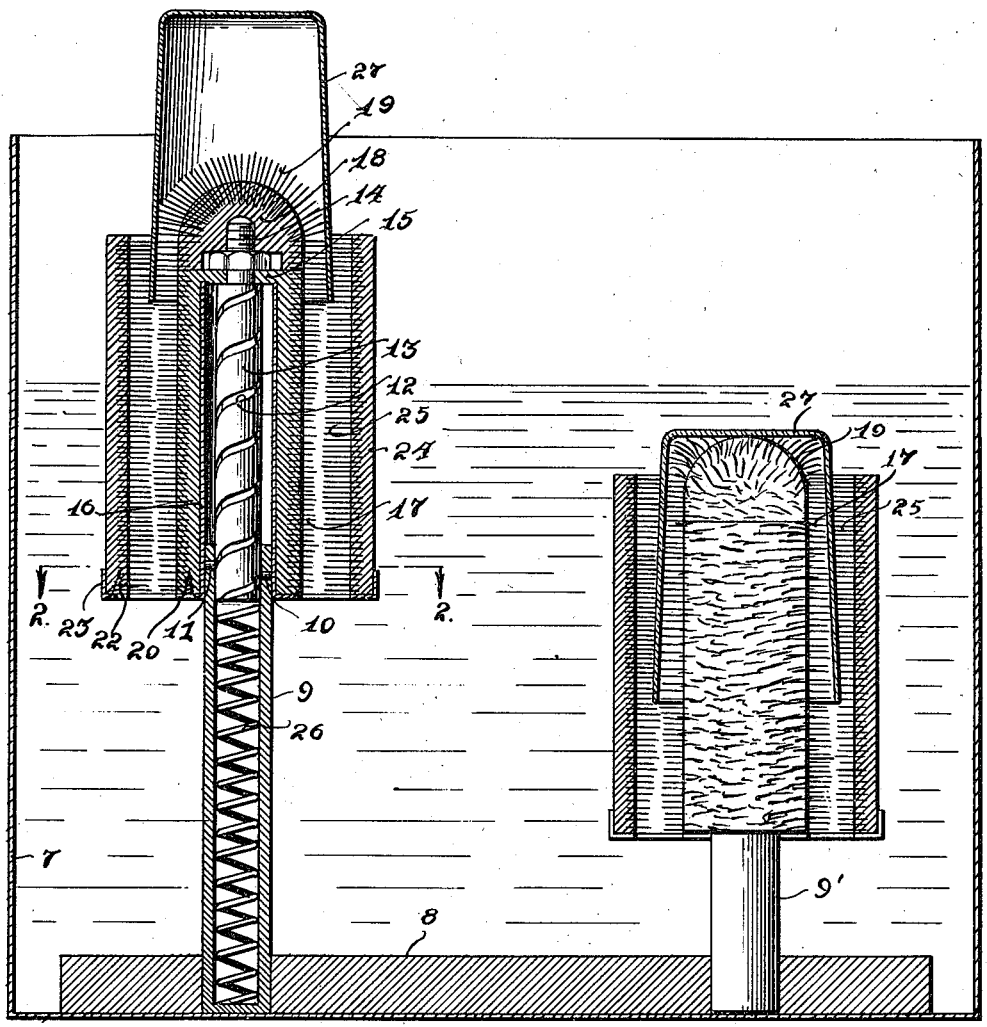
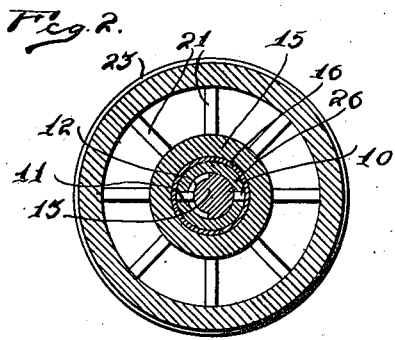
Fig. 2.
INVENTOR.
Gus Nakis
BY
ATTORNEY.

Patented Oct. 19, 1926.

1,603,288

UNITED STATES PATENT OFFICE.

GUS NAKIS, OF DETROIT, MICHIGAN.

GLASS WASHER.

Application filed May 17, 1926. Serial No. 109,551.

My invention relates to a new and useful improvement in a glass washer although as the description proceeds it will appear that the invention may be used for washing cups and with slight modifications bottles or other similar shaped vessels.

It is an object of the present invention to provide rotatable means for washing glasses and the like in which the rotatable member may be manually operated to effect a scrubbing or cleansing of the glass by the rotatable member.

Another object of the invention is the provision of a scrubbing or cleansing member adapted to engage the glass and be set in rotation through pressure exerted upon the glass after mounting upon the scrubbing or washing member.

Another object of the invention is the provision of a glass washer of this class which will be simple in structure, economical of manufacture and highly efficient in use.

Another object of the invention is the provision of a glass washer of this class having a passage formed therein for the precipitation of materials removed from the glass.

Other objects will appear hereinafter.

The invention consists in the combination and arrangement of parts hereinafter described and claimed.

The invention will be best understood from a reference to the accompanying drawings which form a part of this specification and in which, Fig. 1 is a central vertical sectional view of the invention illustrating the cleansing mechanism in two positions of operation.

Fig. 2 is a sectional view taken on substantially line 2—2 of Fig. 1.

The invention is adapted for use with a tank 7 containing water, or other suitable liquid with which the glass may be washed or cleansed. A base 8 is provided which may be positioned in the tank 7, the tank 7 being filled with water to a sufficient height to submerge the scrubbing mechanism. In the drawings I have shown the base 8 as provided with two sets of washing mechanisms and for practical operation it is believed that this arrangement is most desirable and efficient in that the person using the device may handle a glass with each hand. However the number of washing mechanisms mounted on the block may be varied to suit the wishes of the individual using it. Projecting upwardly from the base 8 are guide sleeves 9 and 9'. Each scrubbing mechanism illustrated as mounted on the base 8 is a duplicate of the other and a description of one will suffice as a description of both. Projecting inwardly from the upper end of the sleeve 9 are studs or trunnions 10 and 11 adapted to engage in a spiral groove 12 formed in a shaft 13, this shaft 13 being slidable in the guide sleeve 9 and provided at its upper end with a reduced threaded portion 14. Mounted on the threaded portion 14 which projects through the base 15 is a cup-shaped member, the inner surface of its side walls being lined with a bushing 16 and having its periphery provided with outwardly projecting bristles 17. Threaded on the reduced portion 14 is a head 18, its outer surface being provided with bristles 19. Secured to the open end of the cup-shaped member is a ring 20 connected by ribs 21 to a ring 22, the edges of which are angularly turned upwardly as at 23. Secured to the rim 22 and projecting upwardly therefrom is a cylindrical member 24 having its inner surface provided with bristles 25.

A spring 26 is positioned in the guide sleeve 9 and engages at its upper end the inner end of the shaft 13 tending normally to retain the shaft 13 in elevated relation to the guide sleeve 9. In operation the glass 27 is positioned over the cap 18, the bristles 19 and the bristles 17 being of such a length or diameter as to engage against the inner surface of the glass 27. The bristles 25 project inwardly sufficiently to engage the periphery of the glass 27. Upon pressing the glass downwardly the bristles serve to scrub the inside and outside of the glass, the bristles 19 on the head 18 serving to cleanse the inner surface of the bottom of the glass.

It will be noted that the head 18 is formed spherical so that the bristles 19 engage more firmly against the bottom of the glass 27 at its center. This is desirable in that the foreign material, such as dried milk and the like, will accumulate more thickly on the center of the bottom of the glass so that a closer contact is desired for scrubbing the bottom of the glass. This formation of the head 18 is also provided because the bottom of the glass on the inside is formed slightly concave.

As the glass is pressed downwardly forcing the shaft 13 downwardly into the guide sleeve 9 it is evident that a rotation of the bristle bearing members is effected, the operator holding the glass in his hand to prevent its rotation. As the operator begins to raise the glass from the bristles after a downward pressure a reverse rotation of the bristle bearing members is effected, thus thoroughly cleansing the glass in the water or other liquid which is used.

By having the rings 22 and 20 separated as shown in Fig. 1 the foreign material removed from the glass will be permitted to precipitate itself to the bottom of the tank so that the water in the tank may be used for washing a large number of glasses with very satisfactory results. It is believed that the simplicity of the structure is evident and that its efficiency is clear. The structure is also such that a durable device is formed with a minimum number of parts so that adjustment or repairing of the mechanism is reduced to a minimum.

While I have illustrated and described the preferred form of structure I do not wish to limit myself to the precise form of structure shown but desire to avail myself of such variations and modifications as may come within the scope of the appended claims.

Having thus described my invention what I claim as new and desire to secure by Letters Patent is:

1. A glass washing mechanism of the class described comprising: a base; a sleeve projecting upwardly from said base; a trunnion projecting inwardly from the inner surface of said sleeve; a spirally grooved shaft slidably mounted in said sleeve, said trunnion engaging in said groove and effecting a rotation of said shaft upon its longitudinal movement relatively to said sleeve, a spring mounted in said sleeve for normally retaining said shaft in elevated relation thereto; a cup-shaped member positioned in inverted relation over said shaft and rotatable therewith, bristles projecting outwardly from the periphery of said cup-shaped member; a ring mounted fixedly on the open end of said cup-shaped member; a larger concentrically arranged ring connected to said first mentioned ring, said rings being spaced apart; bristles projecting outwardly from the periphery of said cup-shaped member; a head carried by the end of said shaft, said head being formed cylindrical on its outer end; bristles projecting outwardly from the outer surface of said head, said bristles on said head and said cup-shaped member being adapted for engaging the inner surface of the side walls and bottom walls of a glass positioned in inverted relation thereon; a sleeve mounted on said outer ring; and bristles projecting inwardly from the inner surface of said sleeve for engaging the periphery of said glass, said bristle bearing members being rotatable relatively to said guide sleeve upon downward pressure being exerted on said glass while in said inverted relation.

2. A glass washing mechanism of the class described comprising: a base; a sleeve projecting upwardly from said base; a trunnion projecting inwardly from the inner surface of said sleeve; a spirally grooved shaft slidably mounted in said sleeve, said trunnion engaging in said groove and effecting a rotation of said shaft upon its longitudinal movement relatively to said sleeve, a spring mounted in said sleeve for normally retaining said shaft in elevated relation thereto; a cup-shaped member positioned in inverted relation over said shaft and rotatable therewith, bristles projecting outwardly from the periphery of said cup-shaped member; a ring mounted fixedly on the open end of said cup-shaped member; a larger concentrically arranged ring connected to said first mentioned ring, said rings being spaced apart; bristles projecting outwardly from the periphery of said cup-shaped member; a head carried by the end of said shaft, said head being formed cylindrical on its outer end; bristles projecting outwardly from the outer surface of said head, said bristles on said head and said cup-shaped member being adapted for engaging the inner surface of the side walls and bottom walls of a glass positioned in inverted relation thereon.

In testimony whereof I have signed the foregoing specification.

GUS NAKIS.